United States Patent [19]

Becker

[11] Patent Number: 4,535,863
[45] Date of Patent: Aug. 20, 1985

[54] BATTERY SECURITY AND HOLD-DOWN DEVICE

[76] Inventor: John R. Becker, 3751 W. Crocus Dr., Phoenix, Ariz. 85029

[21] Appl. No.: 526,705

[22] Filed: Aug. 26, 1983

[51] Int. Cl.³ .................... E05B 73/00; H01M 2/04; B60R 18/02
[52] U.S. Cl. .................................. 180/68.5; 49/382; 248/154; 248/551
[58] Field of Search ............... 180/68.5; 248/355, 503, 248/154, 345.1, 551–553; 411/351; 410/2, 156; 105/50, 51; 49/381; 429/9, 121, 163

[56] References Cited

U.S. PATENT DOCUMENTS

| | | | |
|---|---|---|---|
| 916,161 | 1/1963 | Young | 411/373 |
| 1,172,347 | 2/1916 | Ford | 180/68.5 |
| 1,359,446 | 11/1920 | Stephens et al. | 180/68.5 |
| 1,395,992 | 11/1921 | Loudon | 180/68.5 |
| 1,510,184 | 9/1924 | Manning | 180/68.5 |
| 1,673,486 | 6/1925 | Berge | 411/373 |
| 1,887,557 | 11/1932 | Kiedel | 411/373 |
| 2,022,595 | 11/1935 | Gowing | 180/68.5 |
| 2,229,565 | 1/1941 | Hallowell | 411/403 |
| 2,270,563 | 1/1942 | Schnebelen | 180/68.5 |
| 2,514,056 | 7/1950 | Hatfield | 180/68.5 |
| 3,105,567 | 10/1963 | Schultz | 180/68.5 |
| 3,821,998 | 7/1974 | Hollins | 248/359 A |
| 3,826,115 | 7/1974 | Davis | 180/68.5 |
| 4,252,206 | 2/1981 | Burkholder et al. | 180/68.5 |
| 4,372,718 | 2/1983 | Zaydel | 411/389 |

FOREIGN PATENT DOCUMENTS 591856  11/1924  France ................ 180/68.5

Primary Examiner—David M. Mitchell
Assistant Examiner—Eric Douglas Culbreth
Attorney, Agent, or Firm—Herbert E. Haynes, Jr.

[57] ABSTRACT

A device for securing an electric storage battery against theft and holding it in the battery support tray provided in an automotive vehicle. The device includes special stanchions which extend upwardly from the battery support tray to support a rigid plate in overlaying relationship with respect to the top of the battery. The plate is attached to the stanchions with special anti-theft fastener assemblies which require the use of a special removal tool, and a battery hold-down pad is interposed between the plate and the battery to hold it in place.

18 Claims, 7 Drawing Figures

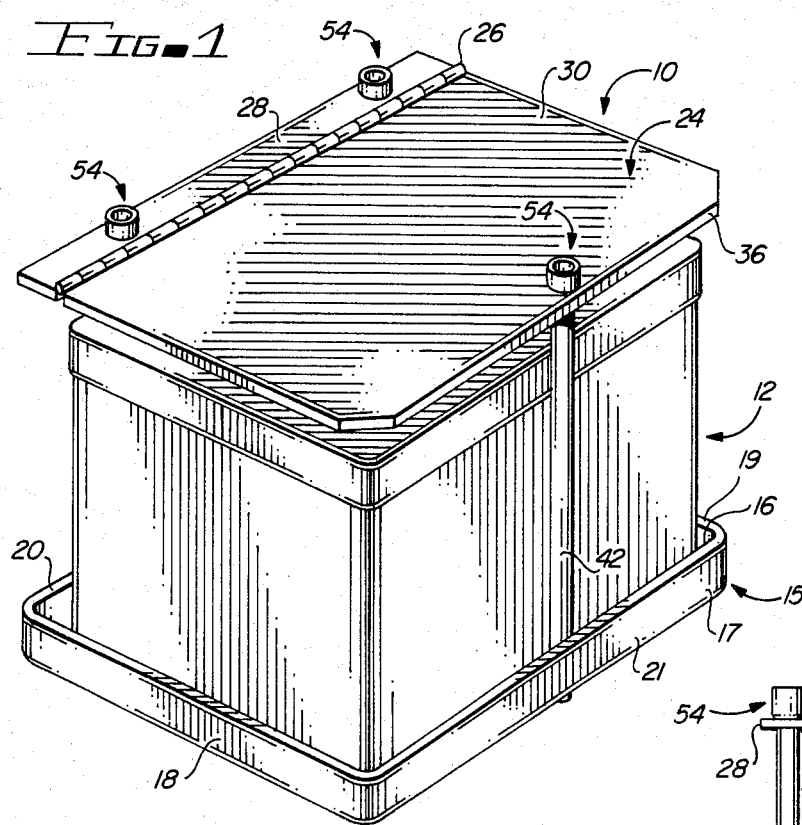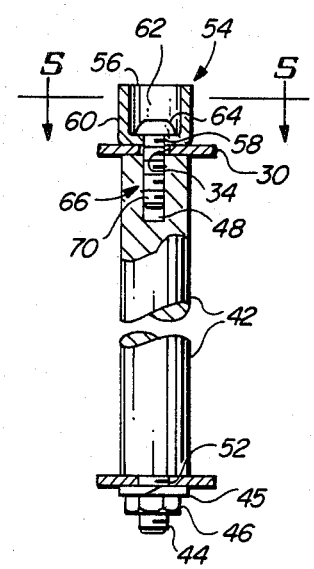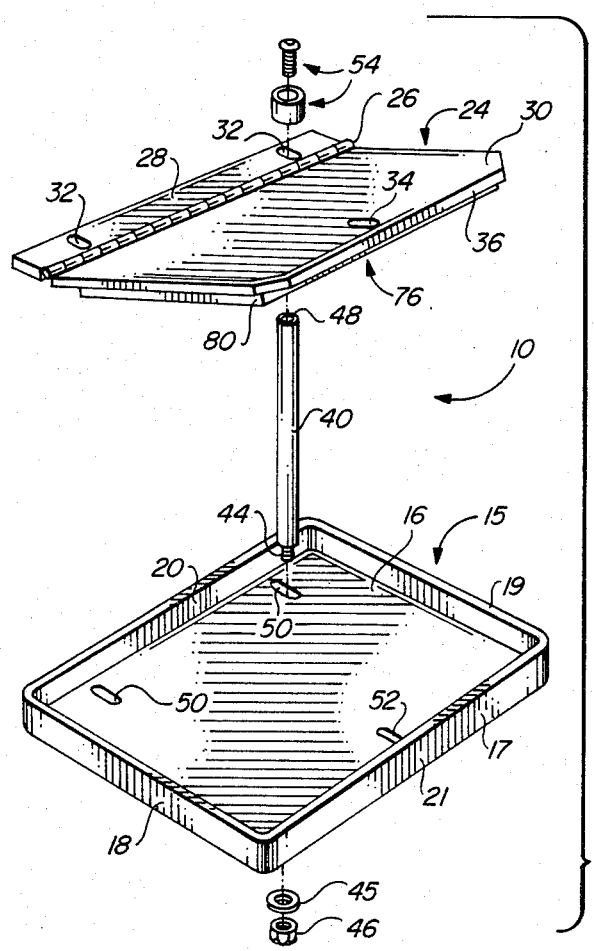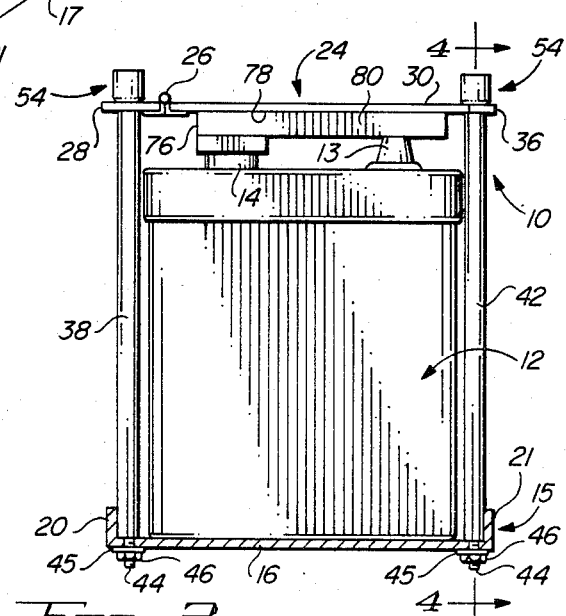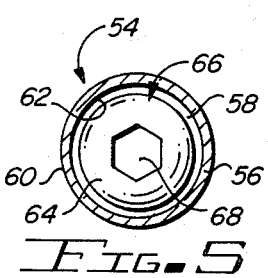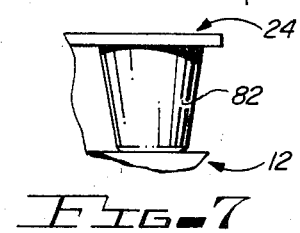

BATTERY SECURITY AND HOLD-DOWN DEVICE

BACKGROUND OF THE INVENTION

1. Field of the Invention

This invention relates generally to electric storage battery accessories, and more particularly to a device which deters theft and holds the battery in place.

2. Description of the Prior Art

The problems related to the theft of automobile parts and accessories are well known and batteries are among the parts which are sought after by thieves. Some automobile owners are resorting to hood locks to protect the engine compartment and others to alarm systems. However, such devices and systems are not in what could be considered widespread usage.

As is well known, automotive type storage batteries are usually mounted in the engine compartment of the vehicle and are supported in a tray-like structure which is mounted fast on the vehicle's frame. A rather large variety of battery hold-down devices are employed to keep the batteries from bouncing around or otherwise moving. A typical example of such a hold-down device is to employ a pair of rods which are provided with hooks or otherwise suitably formed at their lower ends for attachment to the battery support tray provided in the automobile. The rods extend upwardly from the support tray on opposite sides of the battery and are threaded on their uppermost ends. A clamping device is placed on top of the battery, with a typical one of such clamping devices including a spaced pair of angle braces for engaging the opposite top edges of the battery and the angle braces are interconnected by a bar which extends across the battery. The clamping device is mounted on the threaded upper ends of the rods by conventional nuts. Thus, when a thief wants to steal a battery mounted in this manner, all he needs is a common wrench.

U.S. Pat. No. 3,821,998 discloses an apparatus for deterring theft of automobile storage batteries and holding them in place. In this prior art structure, a tray-like pan is securely bonded to the bottom of the storage battery, such as with epoxy. The tray-like pan is provided with depending studs which pass through the battery support tray provided in the vehicle and conventional nuts and washers are mounted on the depending studs. Such a mounting device will deter theft in that the mounting fasteners are no longer easily accessible and in some instances cannot be reached at all except from underneath the vehicle.

This prior art device has, to the best of my knowledge, not received any degree of commercial success. The problem is that due to the great variety of battery sizes, the tray-like pan would need to be manufactured in various sizes and this, of course, is a cost deterrent. Another problem is that resulting from the bonding of the tray-like pan to the bottom of the battery. Such bonding makes it difficult, if not impossible, to remove the tray-like pan from the old battery when the time comes to replace it with a new one. Thus, the tray-like pan cannot be considered as being reusable.

Therefore, a need exists for a new and useful battery security and hold-down device which overcomes, or at least reduces, the problems and shortcomings of the prior art.

SUMMARY OF THE INVENTION

In accordance with the present invention, a new and improved device was disclosed for securing an electric storage battery against theft and holding it in place in the battery support tray provided in an automotive vehicle.

The device includes special stanchions which are attached to the battery support tray of the vehicle, so as to be upstanding from the opposite side edges thereof. The stanchions are of sufficient length to extend above the top of the storage battery and the upper ends of each of the stanchions are provided with fastener receiver means such as threaded bores. A rigid plate is attached to the upper ends of the stanchions in upwardly spaced overlaying relationship with respect to the top of the battery. Special anti-theft security fastener means are employed to attach the plate to the upper ends of the stanchions. A battery hold-down means, such as a rubber pad, is attached to the under surface of the rigid plate so as to depend therefrom into bearing engagement with the top of the battery.

The anti-theft security fastener means used to secure the plate to each stanchion is in the preferred form of a cup-like socket which forms an upwardly opening cavity with an aperture formed through its bottom. A special-use screw is located so that its head is within the cavity and therefore cannot be reached, such as with vice-grip pliers or any other tool from a lateral direction. The shank of the special-use screw extends through the aperture of the socket, through the plate and into threaded engagement with the bore provided in the upper end of the stanchion. The preferred special-use screw is of the type having an internal hexagonal socket, or opening, formed therein so that a special wrench of the type commonly referred to as an allan head wrench must be used to install and remove the special-use screw.

In this manner, the security fastener means deters theft in that only one type of tool can be employed to remove the rigid battery cover plate and that type of tool is not as commonly used as, for example, a conventional open end wrench, and is therefore something that would not commonly be carried by a thief.

In the preferred embodiment, the rigid plate is provided with a relatively narrow stationary flange which is fastened to two of the stanchions located on one side of the battery and a hinge is employed to hingedly connect a movable flap portion thereto. The flap portion is considerably wider than the flange portion of the plate and overlays at least the greater portion of the battery. The extending edge of the flap portion of the plate, i.e., the one furthest from the hinge, is attached to one of the stanchions and when disconnected therefrom, will provide access to the battery for service and maintenance purposes.

Accordingly, it is an object of the present invention to provide a new and improved device for deterring theft of an electric storage battery.

Another object of the present invention is to provide a new and improved device for deterring theft of an electric storage battery and holding such batteries against movement in the battery support trays provided in automotive vehicles.

Another object of the present invention is to provide a device of the above described character which deters battery theft by employing special anti-theft security fastener means to mount a rigid plate in overlaying relationship with respect to the top of the battery.

Another object of the present invention is to provide a device of the above described character wherein the special anti-theft security fastener means can be removed only by means of a single relatively uncommon type of tool.

Still another object of the present invention is to provide a device for deterring theft and holding storage battery in the battery support tray of an automotive vehicle with the device including special stanchions upstanding from the battery support tray on opposite sides of the battery, for supporting a plate in upwardly spaced overlaying relationship with respect to the top of the battery and having a battery hold-down pad on the underside of the plate, with anti-theft fastener means being employed to attach the plate to the stanchions.

Yet another object of the present invention is to provide a device of the above described character wherein the plate is provided with a hingedly movable battery overlaying flap portion to facilitate servicing and maintenance of the battery.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective view illustrating a typical battery and support tray with the battery security and hold-down device of the present invention being installed thereon.

FIG. 2 is a side elevational view showing the typical battery and support tray with the battery security and hold-down device of the present invention installed thereon.

FIG. 3 is a perspective exploded view illustrating the various components of the battery security and hold-down device.

FIG. 4 is a fragmentary sectional view taken along the line 4—4 of FIG. 2.

FIG. 5 is an enlarged sectional view taken along the line 5—5 of FIG. 4.

FIG. 6 is a fragmentary sectional view similar to FIG. 4 and illustrating a modification of the present invention.

FIG. 7 is a fragmentary side elevational view illustrating a modified form of the battery hold-down means.

DESCRIPTION OF THE PREFERRED EMBODIMENTS

Referring more particularly to the drawings, FIGS. 1 and 2 show the battery security and hold-down device of the present invention which is indicated generally by the reference numeral 10. The device 10 is illustrated in those figures as being installed on a typical electric storage battery 12, having the usual terminal posts 13 (one shown) and water filled ports 14 (one shown). The illustrated storage battery 12 is of the type commonly used in automotive vehicles and is shown as being supportingly carried in a battery support tray 15, of the type typically provided in automotive vehicles, and which has the usual bottom 16 with an upstanding endless sidewall 17. The endless sidewall 17 defines an opposed pair of spaced end wall segments 18 and 19, and an opposed pair of spaced sidewall segments 20 and 21, which are usually elongated in comparison to the end walls 18 and 19 due to the rectangular configuration of most of such battery support trays.

The battery security and hold-down device 10 includes a plate means 24 which is of generally planar configuration and of the same basic shape as the battery 12 and is sized so that at least an opposed pair of its edges overhang the battery when in the installed position so as to cover and overlay at least a substantial portion of the top of the battery. The plate means may be fabricated of any suitable material, such as metal, synthetic resin, or otherwise, so long as the plate means 24 is a substantially rigid structure for battery security and hold-down purposes.

In the preferred embodiment, the plate means 24 includes a hinge 26, preferably of the piano hinged type having a non-removable hinge pin, with the hinge 26 interconnecting a relatively narrow flange, or lip, portion 28 and a relatively wider battery cover flap portion 30. The plate means 24 is configured in this manner so that when installed, the cover flap 30 can be hingedly moved from its normal battery overlaying position by removing a single security fastener means, which will hereinafter be described in detail, to provide access to the battery for servicing and maintenance purposes. Alternatively, the plate means could be formed of a single planar plate (not shown), i.e., no hinge, and access to the battery in such a case would necessitate entire removal of the one piece plate. It should be noted that the plate is not provided with any access openings theein. It was found that the positions of the terminals and fill ports on different batteries vary so extensively on the various batteries, that it would be impossible to provide an access opening or openings which would be properly located for all of the battery configurations currently in use without destroying, or at least seriously weakening, the theft deterrent characteristics of the plate means.

As seen best in FIG. 3, the narrow flange portion 28 of the plate means 24 is provided with a pair of apertures 32, preferably of oval configuration for adjustment and alignment purposes, and which are spaced apart so as to be proximate the opposite ends of the flange portion 28. A single aperture 34, of the same preferred oval configuration, is provided adjacent the extending edge 36 of the cover flap portion 30 and is disposed at a point substantially midway between the opposite ends of the extending edge 36.

A spaced apart pair of special stanchions 38 and 40 are employed to secure the narrow flange portion 28 to the battery support tray 15, in a manner which will hereinafter be described in detail, and a third identical stanchion 42 is employed to secure the cover flap portion 30 thereto.

Since the stanchions 38, 40 and 42 can be identical, the following description of the stanchion 42 will be understood to apply also to the stanchions 38 and 40.

As seen best in FIG. 4, the stanchion 42 is an elongated rod which may be of any suitable cross sectional configuration. A stud 44 is provided on the lower end of the stanchion 42 so as to extend axially therefrom, and suitable fasteners, such as the illustrated lock washer 45 and nut 46 are used in conjunction with the studs to secure the stanchion 42 to the battery support tray 15 as will hereinafter be described.

It is to be understood that the described stud 44 and fastener arrangement is but one way of accomplishing the desired objective and by virtue of the nuts 46 being disposed below the battery support tray 15, it will be difficult, if not impossible, to remove them without special extension tools, working from under the vehicle, or the like. However, if an added measure of security is desired, the stanchions could be provided with threaded bores (not shown) in place of the studs 44, and employing suitable bolts (not shown) which can be threadingly attached thereto and lock wired into locked engagement therewith.

The upper end of the stanchion 42 is provided with a fastener receiver means 48 which is shown as being in the forms of an internally threaded axial bore.

As seen best in FIG. 3, the battery support tray 15 is provided with a pair of apertures 50 formed through the bottom 16 thereof and which are disposed in spaced apart relationship proximate the longitudinal edge 20 of the tray. These apertures 50, which are also preferably of oval configuration for alignment and adjustment purposes, are disposed so as to be in vertical alignment with the apertures 32 of the plate means 24 when the plate means is in the installed position. The axially depending studs 44 of the stanchions 38 and 40 pass through different ones of the apertures 50 and the lock washers 45 and nuts 46 are threadingly attached to the studs 44 to secure the stanchions to the tray so that they are upstanding therefrom. The tray 15 is also provided with a similar aperture 52 adjacent the longitudinal edge 21 thereof through which the axial stud 44 of the stanchion 42 is passed to attach the stanchion to the tray in an upstanding position by means of the fastening hardware 45 and 46.

As seen best in FIG. 2, the special stanchions 38, 40 and 42 are sized as to their length so that their opposite ends are disposed above the top surface of the battery for supportingly carrying the plate means 24. The plate means is attached to the upper ends of the stanchions by special security fastener means 54 which are intended to deter theft of the storage battery 12.

The security fastener means 54, a typical one of which is best seen in FIGS. 4 and 5, are each seen to include a socket body means 56 in the form of an upwardly opening cup-shaped cylindrical structure having a bottom 58 with an aperture formed therethrough and an integral upstanding endless sidewall 60 which defines an internal cavity 62. The sockets 56 circumscribingly enclose the head 64 of a special-use fastener means 66 which is shown as a pan-head screw having an internal hex-shaped opening 68 formed therein. The shank portions 70 of the special screws 66 are passed through the apertures provided in the bottoms 58 of their respective socket bodies 56 into threaded engagement with the fastener receiver means 48 of their respective stanchions 38, 40 and 42.

By securing the plate means 24 to the stanchions 38, 40 and 42 with the above described security fastener means 54, the heads 64 of the screws 66 are recessingly disposed within the cavity 62 of the socket body means 56. This prevents the screws 66 from being removed, such as by means of pliers, or any other tool which could otherwise be applied laterally thereto for gripping the periphery of the screw head 64. In addition to this theft preventative measure, the hexagonal socket shaped openings 68 of the screws 66, of course, require that a special wrench, commonly referred to as an allen-head wrench, be used for installation and removal purposes. As is known, allen-head wrenches are not a commonly used tool in comparison to, for example, an open end wrench, screw driver, or the like, and for this reason, the hexagonal openings 68 of the screws 66 will also deter theft.

FIG. 6 shows an alternate embodiment of the security fastener means with this embodiment functioning in exactly the same manner and accomplishing the same objectives. In this modified embodiment, a plate means 24a, of the same general configuration described above with reference to the plate means 24, is formed with dimples, or countersinks 72, which are axially disposed with respect to each of the three apertures 74 (one shown in FIG. 6) formed therein. Thus, the countersinks 72 prevent lateral access to the heads 64 of the special-use screws 66 and thus are a functional equivalent to the hereinbefore described socket body means 56.

The above described special-use screws 66 having the hexagonal opening, or socket 68 could be replaced with an even less common fastener device, such as the known cap screw having a fluted socket (not shown).

As seen best in FIG. 2, the plate means 24 is provided with a battery hold-down means 76 which is preferably attached, such as with a suitable adhesive to the downwardly facing surface 78 of the cover flap portion 30 of the plate means. In the preferred embodiment, the hold-down means is in the form of a resiliently deformable pad 80 which is formed of any suitable material, such as rubber, which is of a dielectric nature and is inert to the corrosive and otherwise deteriorating effects of battery acid. The pad 80 will, as shown, be in bearing engagement with the water filler ports 14 and the terminals 13, and the usual electric cable clamps which were not shown for clarity reasons. This, in conjunction with the two stanchions 38 and 40 being proximate, or in bearing engagement with one side of the battery 12 and the stanchion 42 being proximate, or in bearing engagement, with the opposite side thereof, will firmly hold the battery 12 in the desired location. Alternatively, the pad 80 may be loosely interposed during assembly between the plate means and the top of the battery, and in this manner will accomplish the desired battery hold-down function.

FIG. 7 shows a modification of the battery hold-down means 82 in the form of a plurality of foot-like structures (one shown) of rubber or other appropriate material. The foot-like structures 82 may be of the type sometimes referred to as rubber bumpers, and are attached, for example, proximate the corners of the plate means 24 or 24a, such as by a suitable adhesive, so as to depend from the downwardly facing surface thereof into bearing engagement with the top surface of the battery 12.

While the principles of the invention have now been made clear in the illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A device for securing an electric storage battery against theft from a battery support tray provided in an automotive vehicle, said device comprising:
   (a) at least a pair of stanchions for attachment to the battery support tray adjacent and upstanding from opposite side edges thereof, said pair of stanchions being elongated to locate their upper ends above the top of the battery when the battery is in the support tray and said pair of stanchions are attached thereto;
(b) fastener receiver means integrally formed on the upper end of each of said pair of stanchions;
(c) plate means for attachment to the upper ends of said pair of stanchions in overlaying relationship with the top of the battery when the battery is in the support tray and said pair of stanchions are attached thereto, said plate means including,
  I. an elongated relatively narrow rigid flange for attachment to at least one of said pair of stanchions,
  II. a rigid relatively wider battery cover flap for attachment to the other of said pair of stanchions,
  III. a hinge interconnecting said flange and said flap; and
(d) at least a pair of security fastener means each for engaging said plate means and one of said fastener receiver means for attaching and deterring removal of said plate means from said fastener receiver means.

2. A device as claimed in claim 1 wherein each of said pair of stanchions is provided with means on the lower end thereof for attaching said stanchions to the battery support tray of the automotive vehicle.

3. A device as claimed in claim 2 wherein said means on the lower end of each of said pair of stanchions is an axially extending threaded stud.

4. A device as claimed in claim 1 wherein said fastener receiver means includes an internally threaded axial bore.

5. A device as claimed in claim 1 wherein said battery cover flaps of said plate means is rigid and is configured for overlayingly covering at least the greater part of the entire top surface of the electric storage battery.

6. A device as claimed in claim 1 wherein said battery cover flap of said plate means is rigid and is configured for overlayingly covering the entire top surface of the electric storage battery.

7. A device as claimed in claim 1 wherein each of said pair of security fastener means comprises:
(a) fastener means having a head portion and an axially extending threaded shank; and
(b) socket means for receiving said fastener means, said socket means defining an upwardly opening internal cavity for circumscribingly containing the head portion of said fastener means and having an axial aperture through which the threaded shank of said fastener means dependingly extends when said fastener means is received in said socket means.

8. A device as claimed in claim 7 wherein said fastener means is formed with a hexagonal socket in the head portion thereof.

9. A device as claimed in claim 1 wherein each of said pair of security fastener means comprises:
(a) fastener means having a head portion and an axially extending threaded shank; and
(b) said plate means having a countersink formed therein with an axial aperture formed through the bottom of said countersink for receiving said fastener means, said countersink circumscribingly containing the head portion of said fastener means with the shank portion extending through said aperture when said fastener means is received in said countersink and said aperture.

10. A device as claimed in claim 9 wherein said fastener means is formed with a hexagonal socket in the head portion thereof.

11. A device as claimed in claim 1 and further comprising:
(a) said plate means being in upwardly spaced relationship with respect to the top of the battery when the battery is in the battery support tray and said pair of stanchions are attached to the battery support tray and said plate means is attached to the upper end of said pair of stanchions; and
(b) battery hold-down means interpositionably disposable between said plate means and the top of the battery for bearing engagement with the top of the battery to hold it against movement.

12. A device as claimed in claim 11 wherein said battery hold-down means includes a resiliently deformable pad of chemically inert dielectric material.

13. A device as claimed in claim 11 wherein said battery hold-down means includes at least a pair of foot-like bumper structures of chemically inert dielectric material.

14. A device for securing an electric storage battery against theft and holding it in place in a battery support tray provided in an automotive vehicle, said device comprising:
(a) at least three stanchions for attachment to the battery support tray so that two of said stanchions are adjacent and upstanding from one of the side edges of the battery support tray and the third stanchion is adjacent and upstanding from the opposite side edge of the battery support tray, said stanchions being elongated to locate their upper ends above the top of the storage battery when the battery is in the support tray and said stanchions are attached thereto;
(b) fastener receiver means integrally formed on the upper end of each of said stanchions;
(c) plate means including an elongated relatively narrow rigid flange defining a first edge for attachment to said fastener receiver means of said two of said stanchions and a rigid relatively wider battery cover flap connected to said flange by a hinge, said cover flap defining a second opposite edge for attachment to said fastener receiver means of said third one of said stanchions for locating said plate means in an upwardly spaced overlaying relationship with respect to the top of the storage battery when the battery is in the battery support tray and said stanchion are attached thereto;
(d) at least three security fastener means each for engaging said plate means and different ones of said fastener receiver means for attaching said plate means to said stanchions and deterring removal thereof; and
(e) a battery hold-down means for interposed positioning between said plate means and the top of the battery.

15. A device as claimed in claim 14 wherein each of said security fastener means comprises:
(a) fastener means having a head portion and an axially extending threaded shank; and
(b) socket means for receiving said fastener means, said socket means defining an upwardly opening internal cavity for circumscribingly containing the head portion of said fastener means and having an axial aperture through which the threaded shank of said fastener means dependingly extends when said fastener means is received in said socket means.

16. A device as claimed in claim 15 wherein said fastener means is formed with a hexagonal socket in the head portion thereof.

17. A device as claimed in claim 14 wherein each of said security fastener means comprises:
  (a) fastener means having a head portion and an axially extending threaded shank; and
  (b) said plate means having a countersink formed therein with an axial aperture formed through the bottom of said countersink for receiving said fastener means, said countersink circumscribingly containing the head portion of said fastener means with the shank portion extending through said aperture when said fastener means is received in said countersink and said aperture.

18. A device as claimed in claim 17 wherein said fastener means is formed with a hexagonal socket in the head portion thereof.

* * * * *